US010917710B2

(12) United States Patent
Tsai et al.

(10) Patent No.: US 10,917,710 B2
(45) Date of Patent: Feb. 9, 2021

(54) SYSTEM AND EARPHONE RELATED TO TRANSFORMATION OF SENSED DATA

(71) Applicant: Merry Electronics(Shenzhen) Co., Ltd., ShenZhen (CN)

(72) Inventors: Yu-Fei Tsai, Taichung (TW); Yen-Sheng Chen, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 16/402,251

(22) Filed: May 3, 2019

(65) Prior Publication Data

US 2020/0288228 A1 Sep. 10, 2020

(30) Foreign Application Priority Data

Mar. 8, 2019 (TW) ............................ 108107923 A

(51) Int. Cl.
*H04R 1/10* (2006.01)
*H04R 25/00* (2006.01)
*G06N 20/20* (2019.01)

(52) U.S. Cl.
CPC ........... *H04R 1/1016* (2013.01); *G06N 20/20* (2019.01)

(58) Field of Classification Search
CPC ...... H04R 25/00; H04R 25/55; H04R 25/558; H04R 1/10; H04R 1/105
USPC ................ 381/312, 313, 315, 370, 374, 379
See application file for complete search history.

(56) References Cited

U.S. PATENT DOCUMENTS

| | | | | |
|---|---|---|---|---|
| 8,406,418 B2 * | 3/2013 | Birch | ...................... | H04M 1/05 379/430 |
| 8,744,113 B1 * | 6/2014 | Rickards | ................ | H04R 1/028 379/430 |
| 2003/0002705 A1 * | 1/2003 | Boesen | ............... | H04M 1/6066 381/380 |
| 2008/0013777 A1 * | 1/2008 | Park | ..................... | A61B 5/6803 381/384 |
| 2016/0066078 A1 * | 3/2016 | Baek | .................... | H04R 1/1091 381/74 |

* cited by examiner

*Primary Examiner* — Suhan Ni
(74) *Attorney, Agent, or Firm* — JCIPRNET

(57) ABSTRACT

A system for transforming sensed data is provided. The system includes an inertial sensor and a processor. The inertial sensor generates first sensed data by sensing a motion or behavior of a user. The processor is communicatively connected to the inertial sensor and pre-stores a data transformation model, wherein the data transformation model converts an acceleration vector and an angular velocity vector corresponding to the first sensed data into an acceleration vector and an angular velocity vector corresponding to second sensed data, and outputs the acceleration vector and the angular velocity vector corresponding to the second sensed data to an identification model pre-stored in the processor.

14 Claims, 2 Drawing Sheets

SYSTEM AND EARPHONE RELATED TO TRANSFORMATION OF SENSED DATA

CROSS-REFERENCE TO RELATED APPLICATION

This application claims the priority benefit of Taiwan application serial no. 108107923, filed on Mar. 8, 2019. The entirety of the above-mentioned patent application is hereby incorporated by reference herein and made a part of this specification.

BACKGROUND

Technical Field

The disclosure relates to a system, and more particularly, to an earphone for transforming sensed data.

Related Art

With the advancement of technology, there have been many commercially available smart mobile accessories equipped with a sensor, such as smart bracelets, smart watches and so on. These types of accessories transmit data sensed by the sensor to a smartphone through wireless transmission technology, and the data are then analyzed by an application program on the smartphone, thereby generating an analysis result. Through the analysis result, a user acquires information related to their personal physiological state and movement state, such as their heart rate, number of steps they have walked, and so on.

A smart mobile accessory is capable of storing an identification model for identifying a human body motion, thereby identifying a motion of the user according to sensed data collected by the sensor and the identification model. However, it is usually necessary to collect a large amount of data in order to train a new identification model. Once a change occurs in the design of the mobile accessory, the identification model that was generated according to the original design cannot be used in the mobile accessory with the new design.

SUMMARY

To avoid the need to re-collect and re-process data and train new identification models after a design change, the disclosure proposes a system and an earphone for transforming sensed data.

The disclosure provides an earphone including a speaker, an inertial sensor and a processor. The speaker plays audio data. The inertial sensor senses a motion of a user to generate first sensed data. The processor is communicatively connected to the inertial sensor and the speaker and pre-stores at least one identification model and a data transformation model, wherein the data transformation model transforms the first sensed data received from the inertial sensor into second sensed data, and the at least one identification model determines whether the motion is correct by using the second sensed data, so as to generate an output result.

In an embodiment of the disclosure, the at least one identification model is updated according to the second sensed data.

In an embodiment of the disclosure, the second sensed data includes an acceleration vector and an angular velocity vector different from those in the first sensed data.

In an embodiment of the disclosure, the processor further pre-stores a reference acceleration vector, and updates the first sensed data or the second sensed data based on a vector angle between the acceleration vector in the first sensed data and the reference acceleration vector.

In an embodiment of the disclosure, the processor further pre-stores a reference acceleration vector, determines that the earphone is worn at an incorrect position based on a vector angle between the acceleration vector in the first sensed data and the reference acceleration vector, and issues a prompting message through the speaker in response to the earphone being worn at an incorrect position.

In an embodiment of the disclosure, the data transformation model is adjusted based on an installed position or orientation of the inertial sensor.

In an embodiment of the disclosure, the data transformation model is established by machine learning, deep learning or mathematical modeling.

The disclosure provides a system for transforming sensed data, the system including an inertial sensor and a processor. The inertial sensor senses a motion of a user to generate first sensed data. The processor is communicatively connected to the inertial sensor and pre-stores a data transformation model, wherein the data transformation model converts an acceleration vector and an angular velocity vector corresponding to the first sensed data into an acceleration vector and an angular velocity vector corresponding to second sensed data, and outputs the acceleration vector and the angular velocity vector corresponding to the second sensed data to an identification model pre-stored in the processor.

In an embodiment of the disclosure, the identification model is updated according to the second sensed data.

In an embodiment of the disclosure, the processor determines whether the motion is correct by using the identification model and the second sensed data and generates an output result.

In an embodiment of the disclosure, the processor further pre-stores a reference acceleration vector, and updates the first sensed data or the second sensed data based on a vector angle between the acceleration vector in the first sensed data and the reference acceleration vector.

In an embodiment of the disclosure, the inertial sensor and the processor are both disposed in a mobile device.

In an embodiment of the disclosure, the mobile device further includes a speaker coupled to the processor. The processor further pre-stores a reference acceleration vector, determines that the mobile device is worn at an incorrect position based on a vector angle between the acceleration vector in the first sensed data and the reference acceleration vector, and issues a prompting message through the speaker in response to the mobile device being worn at an incorrect position.

In an embodiment of the disclosure, the data transformation model is adjusted based on an installed position or orientation of the inertial sensor in the mobile device.

In an embodiment of the disclosure, the data transformation model is established by machine learning, deep learning or mathematical modeling.

Based on the above, in the disclosure, with respect to a mobile device with a new design in which an installed position or orientation of an inertial sensor is changed, by using a data transformation model to transform data input to an identification model, the existing identification model can be directly applied in the mobile device with a new design, without a need to re-collect and re-process data and train new identification models.

To make the above features and advantages of the disclosure more comprehensible, examples accompanied with drawings are described in detail as follows.

DESCRIPTION OF THE EMBODIMENTS

Figure 1:
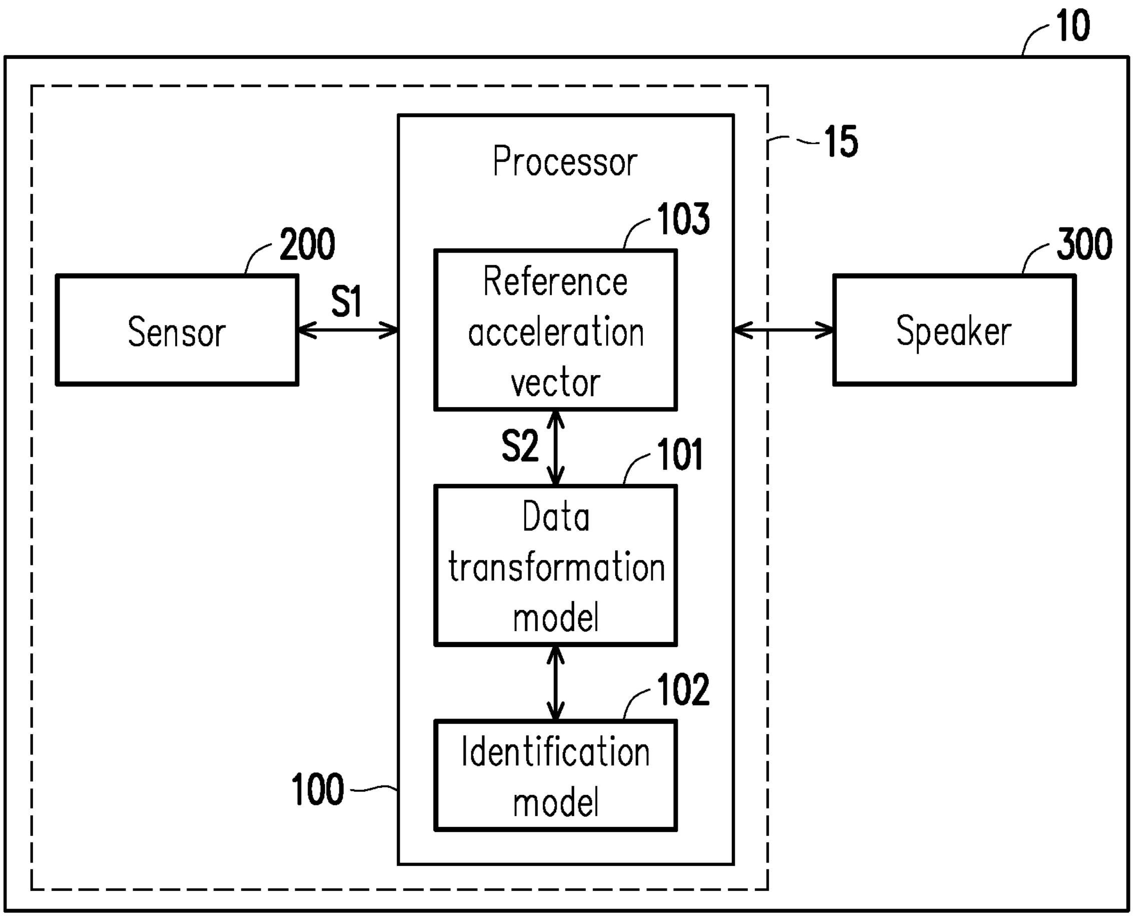
FIG. 1 illustrates a schematic drawing of a system installed in a mobile device for transforming sensed data according to an embodiment of the disclosure.

FIG. 1 illustrates a schematic drawing of a system 15 installed in a mobile device 10 for transforming sensed data according to an embodiment of the disclosure. The system 15 includes a processor 100 and a sensor 200, wherein the sensor 200 is, for example, an inertial sensor 200. However, the disclosure is not limited thereto. To facilitate the explanation, in the embodiment of the disclosure, the sensor 200 is assumed to be the inertial sensor 200.

The processor 100 is, for example, a central processing unit (CPU), or a programmable general purpose or special purpose programmable microprocessor, a digital signal processor (DSP), a programmable controller, an application specific integrated circuit (ASIC) or other similar component or a combination of the foregoing. The disclosure is not limited thereto. In the present embodiment, a storage medium in the processor 100 pre-stores a data transformation model 101, an identification model 102 and a reference acceleration vector 103.

The inertial sensor 200 is communicatively connected to the processor 100. The inertial sensor 200 is configured to sense a motion of a user through inertia in a specific direction to generate first sensed data S1, wherein the motion includes a movement, a specific or nonspecific motion or moving behavior, or the like. For example, the inertial sensor 200 may be an angular velocity sensor, an acceleration sensor, a magnetometer, a gyroscope, a six-axis sensor or a nine-axis sensor. The disclosure is not limited thereto. The first sensed data S1 is, for example, related to parameters such as acceleration vector and/or angular velocity vector that are related to human body motion.

Figure 2:
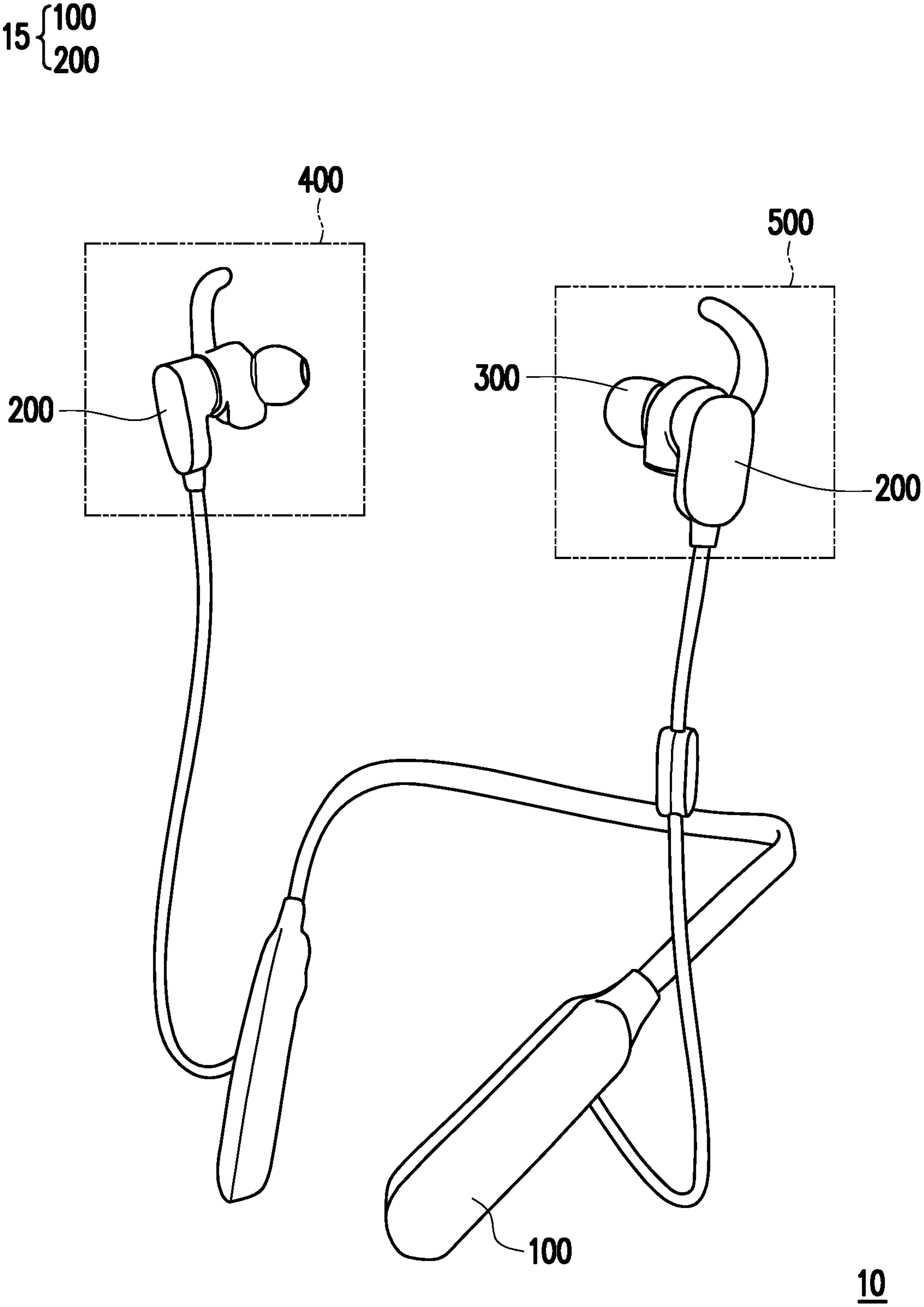
FIG. 2 illustrates a schematic drawing of a type of earphone according to an embodiment of the disclosure.

The system 15 for transforming sensed data may be disposed in the mobile device 10. That is, the processor 100 and the inertial sensor 200 may both be disposed in the mobile device 10. For example, the mobile device 10 may be a type of earphone as shown in FIG. 2. FIG. 2 illustrates a schematic drawing of earphones 10 according to an embodiment of the disclosure. In the following, please refer to FIG. 1 and FIG. 2 together.

The data transformation model 101 and the identification model 102 are pre-stored in the storage medium of the processor 100, wherein the identification model 102 is configured to identify a motion of a user using the earphones 10. The identification model 102 is obtained by training according to a plurality of sensed data generated by the inertial sensor 200, and the identification model 102 is related to an installed position or orientation of the inertial sensor 200. After being generated, the identification model 102 is configured to determine whether the motion of the user of using the earphones 10 is correct by using the first sensed data S1 from the inertial sensor 200, and to generate a corresponding output result. In general, when a designer of the earphones 10 changes the installed position or orientation of the inertial sensor 200 on the earphones 10 in spite of design requirement, the identification model 102 generated with respect to the original installed position cannot accurately determine whether the motion of the user is correct.

For example, the earphones 10 may include a speaker for playing audio data, a first casing 400 corresponding to a first ear of the user and a second casing 500 corresponding to a second ear of the user. If the inertial sensor 200 was originally disposed on the first casing 400 and the identification model 102 was generated based on the case where the inertial sensor 200 is disposed on the first casing 400, the identification model 102 can accurately identify the motion of the user of the earphones 10 according to the first sensed data S1 from the inertial sensor 200 disposed on the first casing 400, thereby determining whether the motion of the user is correct and generating an output result representing a determination result. However, when the designer of the earphones 10 changes the installed position or orientation of the inertial sensor 200 from on the first casing 400 to on the second casing 500, the inertial sensor 200 generated based on the case where the inertial sensor 200 is disposed on the first casing 400 can no longer be used, otherwise identification accuracy may deteriorate. The designer of the earphones 10 may need to train a new identification model based on the case where the inertial sensor 200 is disposed on the second casing 500.

To save labor and time resources needed for collecting and processing data and training new identification models, the disclosure proposes using the data transformation model 101 pre-stored in the processor 100 to transform the first sensed data S1 into second sensed data S2 which is applicable to the identification model 102, wherein the data transformation model 101 may be adjusted based on the installed position or orientation of the inertial sensor 200 on the earphones 10, and the data transformation model 101 is established by, for example, machine learning, deep learning or mathematical modeling.

For example, after the installed position or orientation of the inertial sensor 200 is changed from on the first casing 400 to on the second casing 500 based on a design change, the processor 100 may pre-store the data transformation model 101 corresponding to the second casing 500. After the inertial sensor 200 generates the first sensed data S1 by sensing the motion of the user, the processor 100 converts an acceleration vector and an angular velocity vector in the first sensed data S1 corresponding to the first casing 400 into an acceleration vector and an angular velocity vector in the second sensed data S2 corresponding to the second casing 500. In other words, the second sensed data S2 includes the acceleration vector and the angular velocity vector different from those in the first sensed data S1. Then, the data transformation model 101 outputs the acceleration vector and the angular velocity vector in the second sensed data S2 to the identification model 102 pre-stored in the processor 100. According to the identification model 102 and the second sensed data S2, the processor 100 determines whether the motion of the user is correct and generates the output result corresponding to the determination result.

In an embodiment, according to the reference acceleration vector 103 pre-stored in the processor 100, the processor 100 automatically converts a sensed data error caused by the user's incorrect way of wearing the earphones 10. Specifically, the inertial sensor 200 is, for example, an acceleration sensor, and the reference acceleration vector 103 is, for example, the first sensed data S1 generated by the inertial sensor 200 when the user in a still state wears the earphones 10 in a correct way (or the earphones 10 are worn at correct positions). In other words, if the user wears the earphones 10 in the correct way, the first sensed data S1 generated by the inertial sensor 200 when the user is in the still state should be the same as the reference acceleration vector 103, and a vector angle between the first sensed data S1 and the reference acceleration vector 103 should be zero. In contrast, if the user wears the earphones 10 in an incorrect way (or the earphones 10 are worn at incorrect positions), the first sensed data S1 generated by the inertial sensor 200 should be different from the reference acceleration vector 103, and the vector angle between the first sensed data S1 and the reference acceleration vector 103 should not be zero. The presence of the non-zero vector angle means that there is an error in the first sensed data S1 generated by the inertial sensor 200, and this error is caused by the incorrect way of wearing the earphones 10.

In the case where the vector angle is not zero, the processor 100 may update the first sensed data S1 according to the vector angle between the first sensed data S1 and the reference acceleration vector 103, so that the first sensed data S1 originally corresponding to the incorrect way of wearing can be transformed into the updated first sensed data S1 corresponding to the correct way of wearing before being input to the data transformation model 101. Alternatively, the processor 100 may update the second sensed data S2 according to the vector angle between the first sensed data S1 and the reference acceleration vector 103, so that the second sensed data S2 originally corresponding to the incorrect way of wearing can be transformed into the updated second sensed data S2 corresponding to the correct way of wearing before being input to the identification model 102. In brief, the processor 100 corrects the sensed data error caused by the user's incorrect way of wearing the earphones 10 according to the vector angle between the first sensed data S1 and the reference acceleration vector 103. Therefore, regardless of whether or not the user wears the earphone 10 in the correct way, the identification model 102 is capable of identifying the motion of the user according to the first sensed data S1 or the second sensed data S2 transformed according to the vector angle.

In an embodiment, the second sensed data S2 generated by the processor 100 is used to update the identification model 102. For example, after a certain amount of the second sensed data S2 are accumulated, the processor 100 may update the identification model 102 according to the second sensed data S2 by, for example, machine learning or deep learning.

In an embodiment, the processor 100 determines whether the earphones 10 are worn at incorrect positions according to the reference acceleration vector 103 pre-stored in the processor 100, and issues a prompting message through the speaker 300 in response to the earphones 10 being worn at the incorrect positions, so as to prompt the user to adjust their way of wearing the earphones 10. Specifically, the inertial sensor 200 is, for example, an acceleration sensor, and the reference acceleration vector 103 is, for example, the first sensed data S1 generated by the inertial sensor 200 when the user wears the earphones 10 in the correct way (or the earphones 10 are worn at correct positions). In other words, if the user wears the earphones 10 in the correct way, the first sensed data S1 generated by the inertial sensor 200 should be the same as the reference acceleration vector 103, and the vector angle between the first sensed data S1 and the reference acceleration vector 103 should be zero. Therefore, the processor 100 may determine whether the earphones 10 are worn at correct positions based on whether the vector angle is zero. For example, if the vector angle is zero, it is determined that the earphones 10 are worn at correct positions. In contrast, if the user wears the earphones 10 in the incorrect way (or the earphones 10 are worn at incorrect positions), the first sensed data S1 generated by the inertial sensor 200 should be different from the reference acceleration vector 103, and the vector angle between the first sensed data S1 and the reference acceleration vector 103 should not be zero. Therefore, the processor 100 determines that the earphones 10 are worn at incorrect positions based on the vector angle being not zero, and issues a prompting message to the user through the speaker 300 in response to the earphones 10 being worn at the incorrect positions.

In summary, in the disclosure, the data transformation model is used to transform the first sensed data received from the inertial sensor into the second sensed data applicable to the identification model. Therefore, in the disclosure, when the installed position or orientation of the inertial sensor is changed due to a design change, there is no need to re-collect and re-process data and train new identification models for the mobile device with the new design. Even if a change occurs in the installed position or orientation of the inertial sensor, the mobile device can directly use the existing identification model to identify the motion of the user. In addition, in the mobile device of the disclosure, whether the user wears the mobile device in a correct way can be determined using the inertial sensor. If the way of wearing is incorrect, the mobile device may prompt the user to adjust their way of wearing; alternatively, the mobile device may automatically be adapted to the user's way of wearing so as to improve identification accuracy.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. An earphone, comprising:

a speaker playing audio data;

an inertial sensor sensing a motion of a user to generate first sensed data; and a processor communicatively connected to the inertial sensor and the speaker and pre-storing at least one identification model and a data transformation model, wherein the data transformation model transforms the first sensed data received from the inertial sensor into second data, and the at least one identification model determines whether the motion is correct by using the second data, so as to generate an output result, wherein the second data comprises an acceleration vector and an angular velocity vector different from those in the first sensed data.

2. The earphone of claim 1, wherein the at least one identification model is updated according to the second data.

3. The earphone of claim 1, wherein the processor further pre-stores a reference acceleration vector, and updates one of the first sensed data and the second data based on a vector angle between the acceleration vector in the first sensed data and the reference acceleration vector.

4. The earphone of claim 1, wherein the processor further pre-stores a reference acceleration vector, determines that the earphone is worn at an incorrect position based on a vector angle between the acceleration vector in the first sensed data and the reference acceleration vector, and issues a prompting message through the speaker in response to the earphone being worn at the incorrect position.

5. The earphone of claim 1, wherein the data transformation model is adjusted based on an installed position of the inertial sensor.

6. The earphone of claim 1, wherein the data transformation model is established by machine learning, deep learning or mathematical modeling.

7. A system for transforming sensed data, the system comprising:

an inertial sensor sensing a motion of a user to generate first sensed data; and a processor communicatively connected to the inertial sensor and pre-storing a data transformation model, wherein the data transformation model converts an acceleration vector and an angular velocity vector in the first sensed data into an acceleration vector and an angular velocity vector in second data, and outputs the acceleration vector and the angular velocity vector in the second data to an identification model pre-stored in the processor, wherein the acceleration vector and the angular velocity in the second data different from those in the first sensed data.

8. The system of claim 7, wherein the processor determines whether the motion is correct by using the identification model and the second data and generates an output result.

9. The system of claim 7, wherein the identification model is updated according to the second data.

10. The system of claim 7, wherein the processor further pre-stores a reference acceleration vector, and updates one of the first sensed data and the second data based on a vector angle between the acceleration vector in the first sensed data and the reference acceleration vector.

11. The system of claim 7, wherein the inertial sensor and the processor are both disposed in a mobile device.

12. The system of claim 11, wherein the mobile device further comprises a speaker coupled to the processor, the processor further pre-stores a reference acceleration vector, the processor determines that the mobile device is worn at an incorrect position based on a vector angle between the acceleration vector in the first sensed data and the reference acceleration vector, and the processor issues a prompting message through the speaker in response to the mobile device being worn at the incorrect position.

13. The system of claim 11, wherein the data transformation model is adjusted based on an installed position of the inertial sensor in the mobile device.

14. The system of claim 7, wherein the data transformation model is established by machine learning, deep learning or mathematical modeling.

* * * * *